US009483607B2

(12) United States Patent
Sugiura

(10) Patent No.: US 9,483,607 B2
(45) Date of Patent: Nov. 1, 2016

(54) DOWNHOLE DYNAMICS MEASUREMENTS USING ROTATING NAVIGATION SENSORS

(75) Inventor: Junichi Sugiura, Bristol (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 964 days.

(21) Appl. No.: 13/293,944

(22) Filed: Nov. 10, 2011

(65) Prior Publication Data
US 2013/0124095 A1 May 16, 2013

(51) Int. Cl.
G01V 9/00 (2006.01)
G06F 19/00 (2011.01)
E21B 44/00 (2006.01)
E21B 47/00 (2012.01)
G01H 11/00 (2006.01)
E21B 7/04 (2006.01)

(52) U.S. Cl.
CPC .............. G06F 19/00 (2013.01); E21B 44/00 (2013.01); E21B 7/04 (2013.01); E21B 47/0006 (2013.01); G01H 11/00 (2013.01)

(58) Field of Classification Search
USPC ........................................................... 702/9
See application file for complete search history.

(56) References Cited

U.S. PATENT DOCUMENTS

| 3,525,406 A | 8/1970 | Hart |
| 3,968,473 A | 7/1976 | Patton |
| 4,715,451 A | 12/1987 | Bseisu |
| 4,773,263 A | 9/1988 | Lesage |
| 4,903,245 A | 2/1990 | Close et al. |
| 4,958,125 A | 9/1990 | Jardine |
| 5,226,332 A | 7/1993 | Wassell |
| 5,313,829 A | 5/1994 | Paslay |
| 5,358,059 A | 10/1994 | Ho |
| 5,448,227 A | 9/1995 | Orban |
| 5,448,911 A | 9/1995 | Mason |
| 5,603,386 A | 2/1997 | Webster |
| 5,721,376 A | 2/1998 | Pavone |
| 5,864,058 A | 1/1999 | Chen |

(Continued)

FOREIGN PATENT DOCUMENTS

| WO | 9715749 A | 5/1997 |
| WO | 0037764 A2 | 6/2000 |
| WO | 2010138718 A1 | 12/2010 |

OTHER PUBLICATIONS

Zannoni, S. A., et al.; SPE 26341: "Development and Field Testing of a New Downhole MWD Drillstring Dynamics Sensor;" 68th Annual Technical Conference and Exhibition of the Society of Petroleum Engineers; Houston, Texas; Oct. 3-6, 1993.

(Continued)

Primary Examiner — Paul D Lee

(57) ABSTRACT

A method for making downhole dynamics measurements using rotating navigational sensors includes rotating navigational accelerometers in a subterranean borehole to obtain a string of accelerometer measurements while rotating. The measurements are differentiated to obtain a string of differentiated accelerometer measurements and may then be further processed to obtain a drill string vibration parameter. Substantially simultaneous magnetometer measurements may be obtained and utilized to compute a corrected vibration parameter in which at least one of a gravitational acceleration component, a tangential acceleration component, and a centripetal acceleration component is removed from the vibration parameter.

12 Claims, 6 Drawing Sheets

(56) References Cited

U.S. PATENT DOCUMENTS

| | | | |
|---|---|---|---|
| 6,065,332 A | 5/2000 | Dominick | |
| 6,068,394 A | 5/2000 | Dublin | |
| 6,092,610 A | 7/2000 | Kosmala | |
| 6,216,802 B1 | 4/2001 | Sawyer | |
| 6,233,524 B1 | 5/2001 | Harrell | |
| 6,267,185 B1 | 7/2001 | Mougel | |
| 6,268,726 B1 | 7/2001 | Prammer | |
| 6,427,783 B2 | 8/2002 | Krueger | |
| 6,453,239 B1 | 9/2002 | Shirasaka | |
| 6,518,756 B1 | 2/2003 | Morys | |
| 6,581,699 B1 | 6/2003 | Chen | |
| 6,608,565 B1 | 8/2003 | Van Steenwyk | |
| 6,681,633 B2 | 1/2004 | Schultz | |
| 6,742,604 B2 | 6/2004 | Brazil | |
| 7,222,681 B2 | 5/2007 | Jones | |
| 7,414,405 B2 | 8/2008 | Moore | |
| 7,426,967 B2 | 9/2008 | Sugiura | |
| 7,571,643 B2 | 8/2009 | Sugiura | |
| 2001/0045300 A1 | 11/2001 | Fincher | |
| 2002/0124652 A1 | 9/2002 | Schultz | |
| 2004/0206170 A1 | 10/2004 | Chen | |
| 2004/0222019 A1 | 11/2004 | Estes | |
| 2004/0251898 A1 | 12/2004 | Morys | |
| 2005/0001624 A1* | 1/2005 | Ritter et al. | 324/374 |
| 2005/0001737 A1 | 1/2005 | Baron | |
| 2005/0034985 A1 | 2/2005 | Zamanzadeh | |
| 2005/0071120 A1 | 3/2005 | Hutchinson | |
| 2005/0132794 A1 | 6/2005 | Spross | |
| 2005/0150694 A1 | 7/2005 | Schuh | |
| 2006/0195265 A1 | 8/2006 | Schen et al. | |
| 2007/0107937 A1 | 5/2007 | Sugiura | |
| 2007/0289373 A1 | 12/2007 | Sugiura | |
| 2010/0082256 A1 | 4/2010 | Mauldin et al. | |
| 2011/0147083 A1 | 6/2011 | Mauldin et al. | |
| 2011/0186353 A1 | 8/2011 | Turner et al. | |
| 2012/0062235 A1 | 3/2012 | Khan et al. | |

OTHER PUBLICATIONS

Sugiura, Junichi; SPE 115572: "The Use of the Near-bit Vibration Sensor While Drilling Leads to Optimized Rotary-Steerable Drilling in Push- and Point-the-Bit Configurations," SPE Asia Pacific Oil & Gas Conference and Exhibition; Perth, Australia; Oct. 20-22, 2008.

Sugiura, Junichi, et al.; SPE 112163: "Integrated Approach to Rotary-Steerable Drilling Optimization Using Concurrent Real-Time Measurement of Near-Bit Borehole Caliper and Near-Bit Vibration;" SPE Intelligent Energy Conference and Exhibition; Amsterdam, The Netherlands; Feb. 25-27, 2008.

Pavone, D. R., et al.; SPE 28324: "Application of High Sampling Rate Downhole Measurements for Analysis and Cure of Stick-Slip in Drilling;" SPE 69th Annual Technical Conference and Exhibition; New Orleans, LA, USA; Sep. 25-28, 1994.

Chen, S. L., et al; SPE 56439: "Field Investigation of the Effects of Stick-Slip, Lateral, and Whirl Vibrations on Roller Cone Bit Performance;" SPE Annual Technical Conference and Exhibition; Houston, Texas; Oct. 3-6, 1999.

Examination Report issued in related CA application 2855292 on Apr. 5, 2016, 6 pages.

International Search Report and Written Opinion issued in related PCT application PCT/US2014/032042 on Aug. 7, 2014, 16 pages.

Extended European Report issued in related EP application 12848215.5 on Dec. 2, 2015, 8 pages.

\* cited by examiner

DOWNHOLE DYNAMICS MEASUREMENTS USING ROTATING NAVIGATION SENSORS

CROSS REFERENCE TO RELATED APPLICATIONS

None.

BACKGROUND INFORMATION

It is well known in the art that severe dynamic conditions are sometimes encountered during drilling. Commonly encountered dynamic conditions include, for example, axial vibration, lateral shock and vibration, torsional vibration, and stick/slip. Bit bounce includes axial vibration of the drill string, sometimes resulting in temporary lift off of the drill bit from the formation ("bouncing" of the drill bit off the bottom of the borehole). Axial vibrations (e.g., bit bounce) ARE known to reduce the rate of penetration ("ROP") during drilling, and may cause excessive fatigue damage to bottom hole assembly ("BHA") components, and may also damage the well in extreme conditions.

Lateral vibrations are those which are transverse to the axis of the drill string ("cross-axial"). Such lateral vibrations are commonly recognized as the leading cause of drill string, drill string connection, and BHA failures and may be caused, for example, by bit whirl and/or the use of unbalanced drill string components.

Stick/slip refers to a torsional vibration induced by friction between drill string components and the borehole wall. Stick/slip is known to produce instantaneous drill string rotation speeds many times that of the nominal rotation speed of the table. In stick/slip conditions, a portion of the drill string or bit sticks to the borehole wall due to frictional forces often causing the drill string to temporarily stop rotating. Meanwhile, the rotary table continues to turn, resulting in an accumulation of torsional energy in the drill string. When the torsional energy exceeds the static friction between the drill string and the borehole, the energy is released suddenly in a rapid burst of drill string rotation. Instantaneous downhole rotation rates have been reported to exceed four to ten times that of the rotary table. Stick/slip is known to cause severe damage to downhole tools, as well as connection fatigue, and excess wear to the drill bit and near-bit stabilizer blades. Such wear commonly results in reduced ROP and loss of steerability in deviated boreholes.

These harmful dynamic conditions not only cause premature failure and excessive wear of the drilling components, but also can result in costly trips (tripping-in and tripping-out of the borehole) due to unexpected tool failures and wear. Furthermore, there is a trend in the industry towards drilling deeper, smaller diameter wells where damaging dynamic conditions become increasingly problematic. Problems associated with premature tool failure and wear are exacerbated (and more expensive) in such wells.

The above-described downhole dynamic conditions are known to be influenced by drilling conditions. By controlling such drilling conditions, an operator can sometimes mitigate against damaging dynamic conditions. For example, bit bounce and lateral vibration conditions can sometimes be overcome by reducing both the weight on bit and the drill string rotation rate. Stick/slip conditions can often be overcome via increasing the drill string rotation rate and reducing weight on bit. The use of less aggressive drill bits also tends to reduce bit bounce, lateral vibrations, and stick/slip in many types of formations. The use of stiffer drill string components is further known to sometimes reduce stick/slip. While the damaging dynamic conditions may often be mitigated as described above, reliable measurement and identification of such dynamic conditions can be problematic. For example, lateral vibration and stick/slip conditions are not easily quantified by surface measurements. In fact, such dynamic conditions are sometimes not even detectable at the surface, especially at vibration frequencies above about 5 hertz.

Conventional downhole dynamics measurement systems are known. While these, and other known systems and methods, may be serviceable in certain applications, there is yet need for further improvement. For example, known systems typically make use of dedicated sensors which tend to increase costs and expend valuable BHA geometric configurations (e.g., via the introduction of a dedicated dynamics measurement sub). Also, such dedicated sensors tend to increase power consumption and component counts and, therefore, the complexity of MWD, LWD, and directional drilling tools, and thus tend to reduce reliability of the system. Moreover, dedicated sensors are typically deployed a significant distance above the drill bit.

Therefore there exists a need for an improved method for making downhole dynamics measurements and particularly for making such measurements as close to the drill bit as possible.

SUMMARY

A method for making downhole dynamics measurements using rotating navigational sensors is disclosed. Disclosed embodiments include rotating navigational accelerometers in a subterranean borehole to obtain a string of accelerometer measurements while rotating. The string of accelerometer measurements typically includes a plurality of tri-axial accelerometer measurements made at a predetermined measurement interval. The measurements are differentiated to obtain a string of differentiated accelerometer measurements and may then be further processed to obtain a drill string vibration parameter. Substantially simultaneous magnetometer measurements may be obtained and utilized to compute a corrected vibration parameter in which at least one of a gravitational acceleration component, a tangential acceleration component, and a centripetal acceleration component is removed from the vibration parameter.

The disclosed embodiments may provide various technical advantages. For example, in preferred embodiments the disclosed method makes use of existing navigational sensors deployed in the drill string and therefore does not require the use of dedicated sensor sets. By utilizing the existing navigational sensors, the disclosed embodiments tend to reduce the complexity and the overall power consumption of the downhole measurement system. Moreover, navigational sensors may be deployed very close to the drill bit enabling the acquisition of simultaneous "at-bit" dynamics and borehole surveying measurements.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
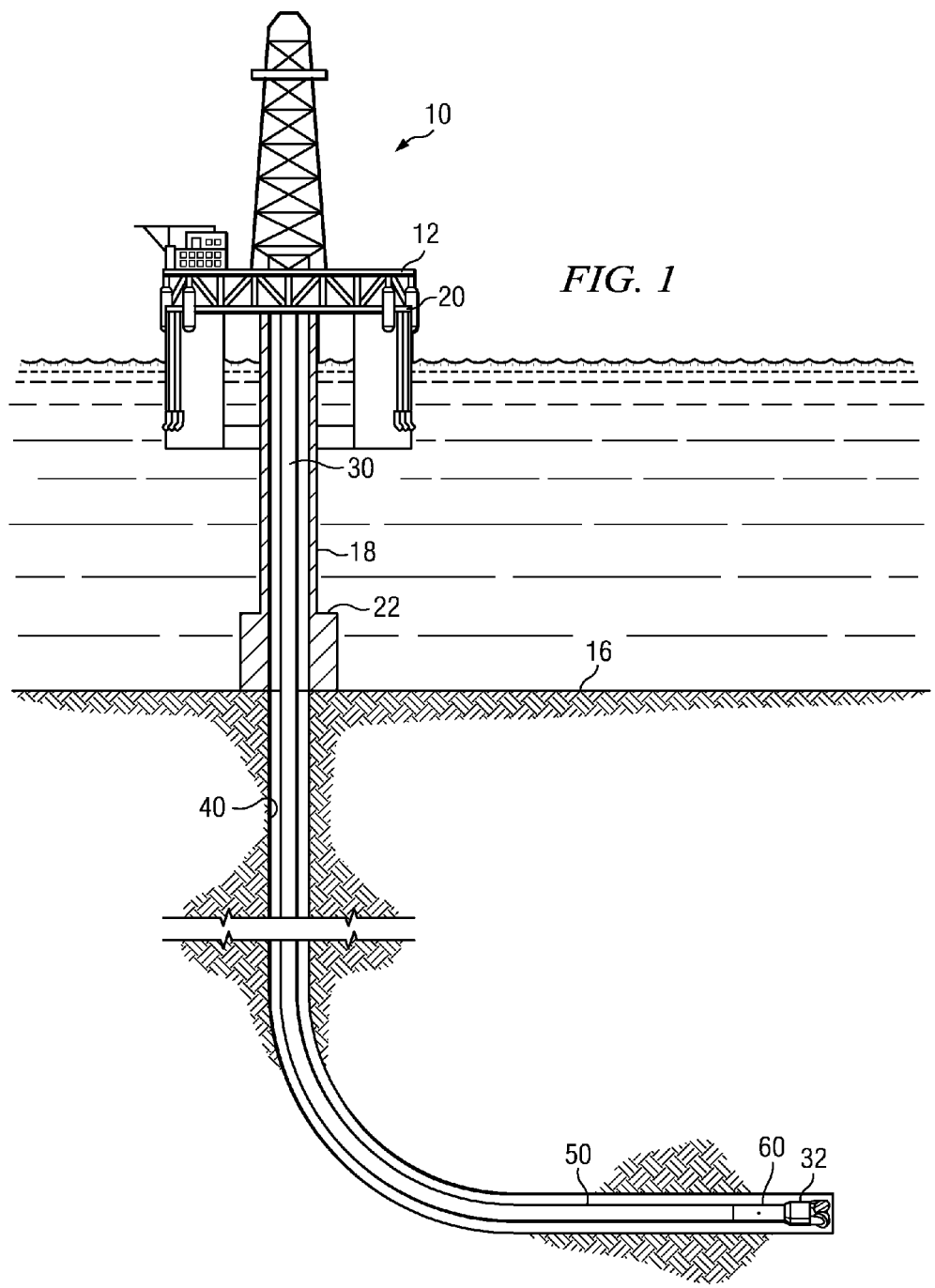
FIG. 1 depicts one example of a conventional drilling rig on which disclosed methods may be utilized.

FIG. 1 depicts drilling rig 10 suitable for using various methods disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 and a near-bit sensor sub 60 (such as the iPZIG® tool available from PathFinder®, A Schlumberger Company, Katy, Tex., USA). Drill string 30 may further include a downhole drilling motor, a steering tool such as a rotary steerable tool, a downhole telemetry system, and one or more MWD or LWD tools including various sensors for sensing downhole characteristics of the borehole and the surrounding formation.

It will be understood by those of ordinary skill in the art that the deployment illustrated on FIG. 1 is merely an example. It will be further understood that disclosed embodiments are not limited to use with a semisubmersible platform 12 as illustrated on FIG. 1. The disclosed embodiments are equally well suited for use with any kind of subterranean drilling operation, either offshore or onshore.

Figure 2:
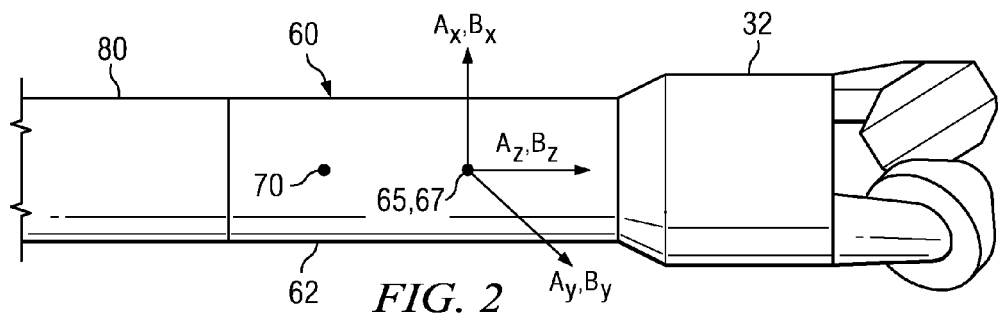
FIG. 2 depicts a lower BHA portion of the drill string shown on FIG. 1.

FIG. 2 depicts the lower BHA portion of drill string 30 including drill bit 32, a near-bit sensor sub 60, and a lower portion of a steering tool 80. In the depicted embodiment, sensor sub body 62 is threadably connected with the drill bit 32 and therefore configured to rotate with the drill bit 32. The sensor sub 60 includes tri-axial accelerometer 65 and magnetometer 67 navigation sensors and may optionally further include a logging while drilling sensor 70 such as a natural gamma ray sensor. In the depicted embodiment, the sensors 65 and 67 may be deployed as closed to the drill bit 32 as possible, for example, within two meters, or even within one meter, of the bit 32.

Suitable accelerometers for use in sensors 65 and 67 may be chosen from among substantially any suitable commercially available devices known in the art. For example, suitable accelerometers may include Part Number 979-0273-001 commercially available from Honeywell, and Part Number JA-5H175-1 commercially available from Japan Aviation Electronics Industry, Ltd. (JAE). Suitable accelerometers may alternatively include micro-electro-mechanical systems (MEMS) solid-state accelerometers, available, for example, from Analog Devices, Inc. (Norwood, Mass.). Such MEMS accelerometers may be advantageous for certain near bit sensor sub applications since they tend to be shock resistant, high-temperature rated, and inexpensive. Suitable magnetic field sensors may include conventional three-axis ring core flux gate magnetometers or conventional magnetoresistive sensors, for example, Part Number HMC-1021D, available from Honeywell.

FIG. 2 further includes a diagrammatic representation of the tri-axial accelerometer and magnetometer sensor sets 65 and 67. By tri-axial it is meant that each sensor set includes three mutually perpendicular sensors, the accelerometers being designated as $A_x$, $A_y$, and $A_z$ and the magnetometers being designated as $B_x$, $B_y$, and $B_z$. By convention, the z-axis accelerometer and magnetometer ($A_z$ and $B_z$) are oriented substantially parallel with the borehole as indicated (although disclosed embodiments are not limited in this regard). Each of the accelerometer and magnetometer sets may therefore be considered as determining a plane (the x and y-axes) and a pole (the z-axis along the axis of the BHA).

The accelerometer and magnetometer sets are typically configured for making downhole navigational (surveying) measurements during a drilling operation. Such measurements are well known and commonly used to determine, for example, borehole inclination, borehole azimuth, gravity toolface, and magnetic toolface. Being configured for making navigational measurements, the accelerometer and magnetometer sets 65 and 67 are rotationally coupled to the drill bit 32 (e.g., rotationally fixed to the sub body 62 which rotates with the drill bit). The accelerometers are also typically electronically coupled to a digital controller via a low-pass filter (including an anti-aliasing filter) arrangement. Such "DC coupling" is generally preferred for making accelerometer based surveying measurements (e.g., borehole inclination or gravity toolface measurements). The use of a low-pass filter band-limits sensor noise (including noise caused by sensor vibration) and therefore tends to improve sensor resolution and surveying accuracy.

Figure 3:
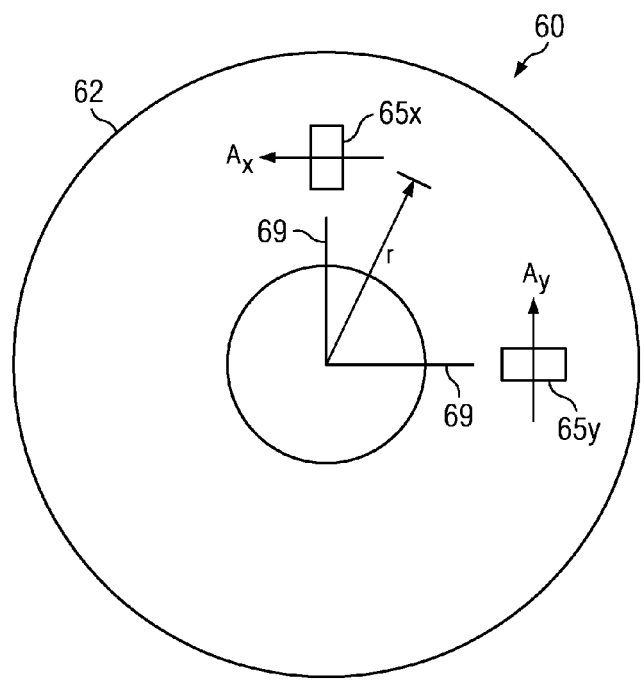
FIG. 3 depicts a circular cross section of an accelerometer arrangement deployed in the lower BHA shown on FIG. 2.

FIG. 3 depicts a circular cross sectional view of one example accelerometer arrangement in sensor sub 60. In the depicted embodiment, the x-axis and y-axis accelerometers 65x and 65y are circumferentially spaced apart from one another by about 90 degrees. The z-axis accelerometer is not depicted and may be deployed substantially anywhere in the sub body 62. The accelerometers 65x and 65y may each be aligned with a radial direction 69 such that each accelerometer is substantially insensitive to centripetal acceleration (i.e., the radially directed acceleration caused by a uniform rotation of the sub body 62). The accelerometers remain sensitive to tangential acceleration (i.e., acceleration caused by non-uniform rotation of the sub body 62). The arrangement therefore remains sensitive to stick/slip (torsional vibration) conditions. It will be understood that the disclosed method embodiments are not limited to use with the depicted accelerometer arrangement. For example, accelerometers 65x and 65y may be deployed at substantially the same location in the tool body 62. The accelerometers 65x and 65y may alternatively be aligned with a tangential direction such that they are substantially insensitive to tangential acceleration and sensitive to centripetal (radial) acceleration.

Figure 4:
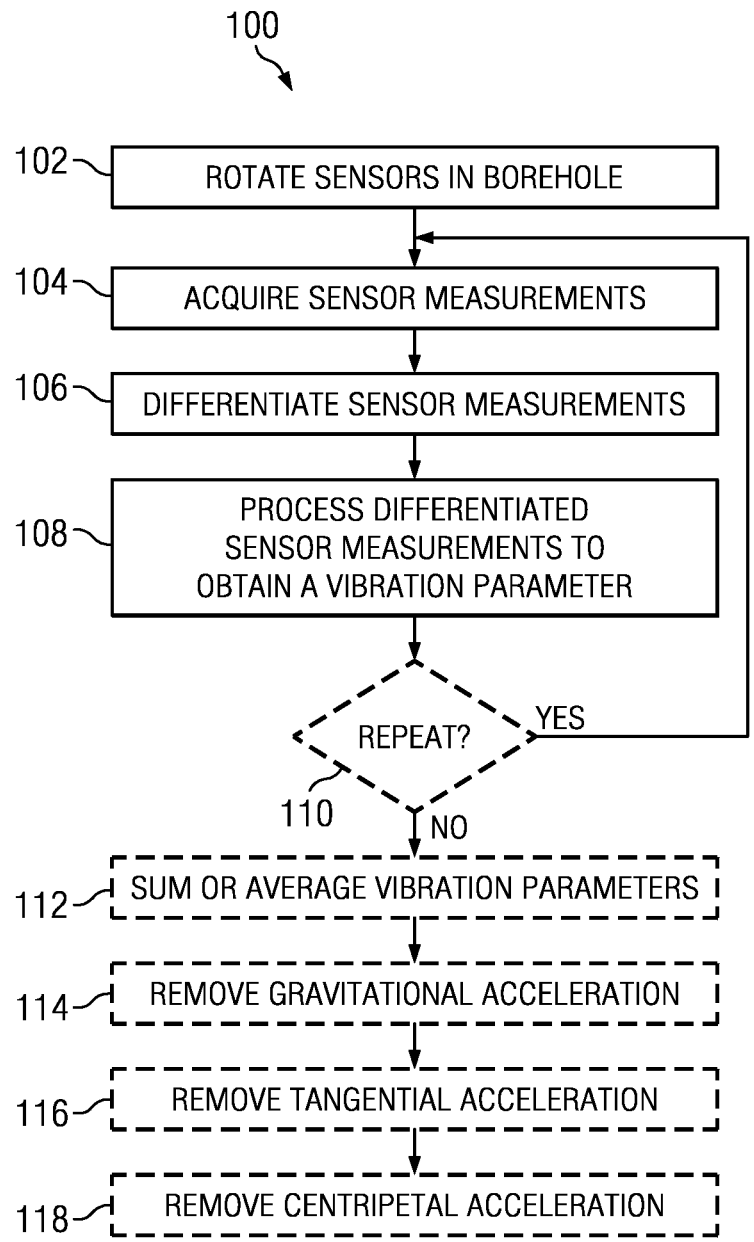
FIG. 4 depicts a flow chart of one disclosed method embodiment.

FIG. 4 depicts a flow chart of one example of a method 100 for making downhole dynamics measurements with rotating navigational sensors. Navigational sensors are rotated in a borehole at 102, for example, while drilling the borehole (by either rotating the drill string at the surface or rotating the drill bit with a conventional mud motor). Conventionally, the x- and y-axis navigation sensor data are unused while the sensors are rotated (e.g., drill string or drill bit rotation during drilling). The navigational sensors typically include a tri-axial accelerometer set and a tri-axial magnetometer set as described above with respect to FIGS.

2 and 3. Moreover, the sensors may be deployed as close to the bit as possible, for example, in a near-bit sensor sub as is also described above with respect to FIGS. 2 and 3.

Accelerometer measurements are made at a predetermined time interval at 104 while rotating in 102 (e.g., during the actual drilling process) to obtain a set (or array) of accelerometer measurements. The accelerometer measurements may then be digitally (numerically) differentiated at 106 to remove a DC component of the acceleration and obtain a set of differentiated accelerometer measurements (i.e., acceleration differences). Maximum and minimum difference values obtained over some time period or number of difference samples may then be processed at 108 to obtain a drill string vibration parameter. This process may be optionally repeated substantially any number of times at 110 to obtain an averaged difference value at 112. This averaged value may then be taken as an indication of lateral or axial vibration as is described in more detail below.

It will be appreciated by those of ordinary skill in the art that the accelerometer measurements obtained at 104 commonly include numerous acceleration components. For example, depending on the drilling conditions and the accelerometer configuration, such measurements may include: (i) a gravitational acceleration component due to the gravitational field of the earth, (ii) a centripetal acceleration component due to the rotational speed of the sensor sub body, (iii) a tangential acceleration component due to the rotational acceleration of the sensor sub body, and (iv) one or more vibrational components due to lateral and/or axial vibration of the drill string. Components (i), (ii), and (iii) may be considered as unwanted noise in applications in which the accelerometer measurements are being used as an indicator of lateral and/or axial vibration. In certain embodiments, it may therefore be advantageous to remove one or more of the non-vibrational components of the accelerometer measurements. For example only, method 100 may further optionally include the removal of any one, two, or all three of the following: (i) a gravitational acceleration component at 114, (ii) a tangential acceleration component at 116, and/or (iii) a centripetal acceleration component at 118 (since these accelerations may register in the x-, y- and/or z-axis accelerometers and be taken to be the result of lateral vibration).

With continued reference to FIG. 4, the accelerometer measurements made at 104 may be made at a rapid interval so as to be sensitive to drill string vibration. The interval may be in the range from about 0.0001 to about 0.1 second (i.e., a measurement frequency in the range from about 10 to about 10,000 Hz). For example, in one embodiment a measurement interval of 10 milliseconds (0.01 second) may be successfully utilized. These accelerometer measurements may then be numerically differentiated at 106, for example, as follows:

$$Ai_d = Ai(n) - Ai(n-1) \quad \text{Equation 1}$$

where $Ai_d$ represents the differentiated accelerometer measurements (i.e., a difference between sequential acceleration measurements), Ai represents a measured acceleration value made along the i-axis (i being representative of the x-, y-, and/or z-axis), and n represents the array index in the set of accelerometer measurements such that $Ai(n-1)$ and $Ai(n)$ represent sequential accelerometer measurements. It will be understood that the differentiation may be performed one measurement point at a time (i.e., as each data point is acquired) or as a set of measurements after a predetermined number of measurements has been acquired. The disclosed methods are not limited in these regards.

The differentiated accelerometer measurements may then be processed to obtain a vibration parameter at 108, for example, by computing a difference between the maximum and minimum values of the differentiated accelerometer measurements, for example, as follows:

$$Ai_\Delta = \max Ai_d - \min Ai_d \approx 2\max Ai_d \quad \text{Equation 2}$$

where $Ai_\Delta$ represents the vibration parameter and $\max Ai_d$ and $\min Ai_d$ represent the maximum and minimum differentiated acceleration values over a predetermined time period or for a predetermined number of samples (e.g., as determined in Equation 1). It will be understood that the differentiated accelerometer measurements (e.g., from Equation 1) may be integrated and smoothed prior to computing the difference in Equation 2. Such sub-sampling may enable the vibration severity to be evaluated at substantially any suitable frequency. In the embodiments described above, the original sampling rate is 100 samples per second. By integration, the differentiated data may be sub-sampled at substantially any other suitable frequency, for example, including 10 or 50 samples per second. The sub-sampled data may then be evaluated so as to monitor the vibration severities at predetermined frequencies (i.e., at other measurement intervals).

In one suitable embodiment, a measurement interval of 10 milliseconds and a time period of 1 second are utilized such that the set of acceleration differences determined in Equation 1 includes 100 raw differentiated acceleration values. The maximum and minimum values of the set may then be used to compute a vibration parameter in Equation 2. This process of differentiating the accelerometer measurements over a predetermined time period (e.g., 1 second) may then be repeated substantially any suitable number of times to obtain a corresponding set of vibration parameters at 110. In one embodiment of the invention, ten sequential vibration parameters may be averaged (or summed) to obtain a single vibration parameter which is indicative of the drill string vibration within a 10 second time window (i.e., over 10 one-second time periods). A smoothing algorithm may alternatively be utilized in which the vibration parameters may be averaged (or summed) with predetermined nearest neighbors to determine a vibration parameter which is indicative of the drill string vibration within a one-second time window. Such smoothing may be advantageous for computing vibration severities that may be transmitted in real-time to the surface thereby enabling the driller to change certain drilling parameters if necessary and to observe the effects of such changes (e.g., to drill string rotation rate, weight on bit, drilling fluid flow rate, etc.). The disclosed methods are not limited in regard to such averaging or smoothing techniques. The parameter obtained directly from Equation 2 (with no averaging or smoothing) may likewise be utilized.

Removal of various non-vibration acceleration components may be advantageous in certain embodiments so as to isolate the vibrational component(s) and to obtain a corrected vibration parameter. For example, a gravitational acceleration component may be optionally removed at 114 from the vibration parameter determined in Equation 2 as follows:

$$Vi_\Delta = Ai_\Delta - Gi_\Delta \quad \text{Equation 3}$$

where $Vi_\Delta$ represents the corrected vibration parameter, $Gi_\Delta$ represents a gravitational acceleration component, and $Ai_\Delta$ represents the vibration parameter described above with respect to Equation 2.

Figure 5A:
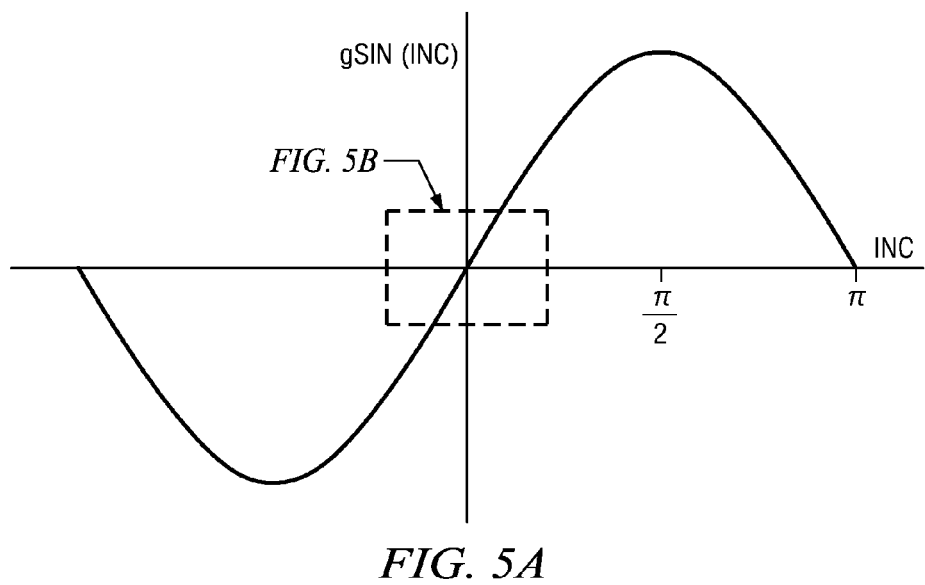
FIGS. 5A and 5B depict a plot of gravitational acceleration versus toolface angle of the sensor sub.
Figure 5B:
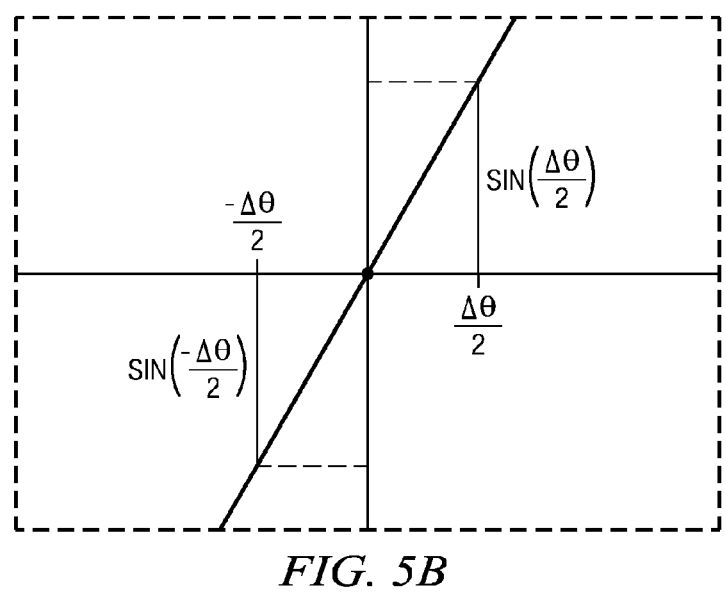

FIGS. 5A and 5B depict one methodology for determining $Gi_\Delta$. As depicted on FIG. 5A, the instantaneous gravitational acceleration as well as the differentiated gravitational acceleration Gi at the sensor set is mathematically related to the borehole inclination (Inc) and the toolface angle of the accelerometer (θ). Following the methodology of Equations 1 and 2, the gravitational acceleration component may be expressed mathematically, for example, as follows:

$$Gi_\Delta = \max Gi_d - \min Gi_d \approx 2\max Gi_d \quad \text{Equation 4}$$

where $\max Gi_d$ and $\min Gi_d$ represent the maximum and minimum differentiated gravitational acceleration values. It is well known that the maximum slope of a sine wave is located at the zero crossing as indicated in FIG. 5B. The maximum differentiated gravitational acceleration may be represented mathematically, for example, as follows:

$$\max Gi_d = g \sin(Inc)[\sin(\Delta\theta/2) - \sin(-\Delta\theta/2)] \quad \text{Equation 5}$$

where $\Delta\theta$ represents the toolface angle change over the predetermined measurement interval described above (e.g., the change in toolface angle over a 10 millisecond interval between sequential accelerometer measurements), g represents the gravitational acceleration of the earth (which is well known to be approximately 9.8 m/sec²), and Inc represents the borehole inclination. Substituting Equation 5 into Equation 4 and recognizing that $\sin\theta = \theta$ for small angles and that $\Delta\theta = 2\pi \cdot t \cdot R/60$, where t represents the predetermined measurement interval in units of seconds and R represents the rotational velocity of the accelerometer in units of RPM, yields:

$$Gi_\Delta = \frac{\pi}{15} Rtg |\sin(Inc)| \quad \text{Equation 6}$$

where i represents one of the cross-axial axes (i.e., x- or the y-axis). Note that the cross-axial gravitational acceleration component is a maximum in a horizontal well (90 degree inclination) and near zero in a vertical well (zero degree inclination). The axial gravitational acceleration component is described in more detail below.

As indicated in Equation 6, the gravitational acceleration component may be removed from the vibration parameter to obtain a corrected vibration parameter when the borehole inclination and rotation rate of the sensor are known. As is well known in the art, the borehole inclination may be obtained from the accelerometer measurements, for example, according to one of the following equations:

$$\tan(Inc) = \frac{Az}{\sqrt{Ax^2 + Ay^2}} \quad \text{Equation 7}$$

$$\cos(Inc) = \frac{Az}{mag(G)}$$

where Ax, Ay, and Az represents the measured tri-axial acceleration values as described above and mag(G) represents the magnitude of the earth's gravitational field. The magnitude of the earth's gravitation field may obtained from geological surveys, measured on site, or determined from the accelerometer measurements, e.g., via $magG = \sqrt{(Ax^2 + Ay^2 + Az^2)}$. The rotation rate of the sensor sub may also be obtained from the accelerometer measurements but may be advantageously obtained from substantially simultaneous magnetometer measurements, for example, as follows:

$$R = \frac{30}{\pi}\omega = \frac{30}{\pi}\left[\frac{\theta_m(n) - \theta_m(n-1)}{t}\right] \quad \text{Equation 8}$$

where R represents the rotation rate in units of RPM, ω represents the angular velocity in units of radians per second, $\theta_m$ represents the magnetic toolface, t represents the predetermined measurement interval, and n represents the array index in the set of magnetic toolface measurements such that $\theta_m(n-1)$ and $\theta_m(n)$ represent sequential magnetic toolface measurements. Those of ordinary skill in the art will readily appreciate that $\tan\theta_m = My/Mx$ where Mx and My represent the x-axis and y-axis magnetometer measurements. Those of ordinary skill will also be readily able to re-write Equation 8 such that the rotation rate is expressed in alternative units such as in radians per second or degrees per second (the disclosed embodiments are not limited in these regards). Equation 8 may also be written with respect to accelerometer based toolface measurements in which $\tan\theta_a = Ay/Ax$. Moreover, gravity toolface and magnetic toolface may be computed from one another by adding (or subtracting) the angle difference between them, where the angle difference may be computed, for example from a conventional static survey.

With reference again to FIG. 4, the tangential acceleration component may be optionally removed from the vibration parameter at 116 to obtain a corrected vibration parameter, for example, as follows:

$$Vi_\Delta = Ai_\Delta - Ti_\Delta \quad \text{Equation 9}$$

where $Vi_\Delta$ represents the corrected vibration parameter, $Ti_\Delta$ represents the tangential acceleration component, and $Ai_\Delta$ represents the vibration parameter described above with respect to Equation 2. In Equations 9-14, i represents one of the cross-axial axes (i.e., x- or the y-axis) as there is generally minimal z-axis (axial) tangential or centripetal acceleration. Tangential acceleration is related to the angular acceleration (i.e., the rate of change of the rotation rate) of the sensor (the accelerometer) and may be expressed mathematically, for example, as follows:

$$Ti = r\alpha = r\left[\frac{\omega(n) - \omega(n-1)}{t}\right] \quad \text{Equation 10}$$

where Ti represents a substantially instantaneous tangential acceleration, r represents the radial distance between the accelerometer and the center of the sensor sub (i.e., the radius), α represents the angular acceleration of the sensor, ω represents the angular velocity of the sensor, t represents the predetermined measurement interval, and n represents the array index in the set of angular velocity measurements such that $\omega(n-1)$ and $\omega(n)$ represent sequential angular velocity measurements. The angular velocity ω may be advantageously obtained by differentiating the magnetic toolface measurements, for example, as shown below in Equations 13 and 19. Following the methodology of Equations 1 and 2, a tangential acceleration component $Ti_\Delta$ may be expressed mathematically, for example, as follows:

$$Ti_\Delta = \max Ti - \min Ti \approx 2\max Ti \quad \text{Equation 11}$$

where maxTi and minTi represent the maximum and minimum instantaneous tangential accelerations within a set of measurements (made for example within a predetermined time period).

With continued reference to FIG. 4, a centripetal acceleration component may be optionally removed from the vibration parameter at 118, for example, as follows:

$$Vi_A = Ai_A - Ci_A \qquad \text{Equation 12}$$

where $Vi_A$ represents the corrected vibration parameter, $Ci_A$ represents the centripetal acceleration component, and $Ai_A$ represents the vibration parameter as described above in Equation 2. When utilizing an accelerometer arrangement such as that depicted on FIG. 3, the measured centripetal acceleration tends to be near zero, however, removal of the centripetal acceleration component may be advantageous when utilizing alternative accelerometer arrangements. Centripetal acceleration is related to the angular velocity (i.e., the rotation rate) of the sensor sub and may be expressed mathematically, for example, as follows:

$$Ci = r\omega^2 = r\left[\frac{\theta_m(n) - \theta_m(n-1)}{t}\right]^2 \qquad \text{Equation 13}$$

where Ci represents a substantially instantaneous centripetal acceleration, r represents the radial distance between the accelerometer and the center of the sensor sub (i.e., the radius), $\omega$ represents the angular velocity of the sensor, $\theta_m$ represents the magnetic toolface of the sensor, t represents the predetermined measurement interval, and n represents the array index in the set of magnetic toolface measurements such that $\theta_m(n-1)$ and $\theta_m(n)$ represent sequential magnetic toolface measurements. Following the methodology of Equations 1 and 2, the centripetal acceleration component $Cx_A$ may be expressed mathematically, for example, as follows:

$$Ci_A = \max Ci - \min Ci \qquad \text{Equation 14}$$

where max Ci and min Ci represent the maximum and minimum instantaneous centripetal accelerations within a set of measurements (made for example within a predetermined time period). Those of ordinary skill in the art will readily appreciate that Equations 8, 10, and 13 may be equivalently expressed in terms of angular acceleration and angular velocity vectors $\vec{\alpha}$ and $\vec{\omega}$ (the disclosed embodiments are not limited in this regard).

It will be understood that tangential and centripetal accelerations are primarily sensed by the cross-axial accelerometers (i.e., the x- and y-axis accelerometers) while the axial accelerometer (the z-axis accelerometer) tends to be insensitive tangential and centripetal accelerations. However, misalignment of the accelerometers with the previously defined tool coordinate system can result in significant tangential and centripetal accelerations being sensed by all three accelerometers.

It will further be understood that the vibration parameter corrections described above with respect to Equations 3-14 advantageously make use of substantially simultaneous magnetic field measurements. For example, substantially instantaneous magnetic toolface measurements may be computed from magnetic field measurements made at the predetermined time interval (e.g., via $\tan \theta_m = My/Mx$ where Mx and My represent the x-axis and y-axis magnetometer measurements). The magnetic toolface may be differentiated as given in Equation 19 to obtain substantially instantaneous angular velocities which may in turn be further differentiated as shown in Equation 10 to obtain substantially instantaneous angular accelerations. It will further be understood that the accelerometer and magnetometer sensors commonly include hardware low-pass filters (as described above). These filters typically have different cut-off frequencies and phase responses. In general, accelerometers have lower cut-off frequencies as their measurements are more sensitive to shock and vibration. Notwithstanding, such hardware filter characteristics difference may be compensated digitally using techniques known to those of ordinary skill in the art.

In one example of the disclosed method embodiments, a lateral vibration parameter may be obtained via combining both cross-axial accelerometer measurements (the x-axis and y-axis accelerometers). The combined lateral vibration parameter may be computed, for example, as follows:

$$Vxy = \sqrt{Vx^2 + Vy^2} \qquad \text{Equation 15}$$

where Vxy represents the combined lateral vibration parameter and Vx and Vy represent the cross-axial lateral vibration parameters computed, for example, via one of Equations 2, 3, 9, or 12 using corresponding x- and y-axis accelerometer measurements. Also, by analyzing the sign (vibration direction) of both x-axis and y-axis vibrations (Vxy), the type of lateral vibration (e.g. forward whirl, backward whirl, chaotic whirl etc.) and the movement of drillstring, stabilizer, and bit (depending on sensor position) may be identified.

In another example, an axial vibration parameter may be readily obtained using the axial (z-axis) accelerometer, for example, via Equation 2 or 3. The z-axis accelerometer is not generally sensitive to tangential or centripetal accelerations as described above, and hence removal of these components is not generally advantageous. However, it may be advantageous to remove a gravitational acceleration component, for example, following the procedure described above with respect to Equations 3-6 such that:

$$Vz_A = Az_A - Gz_A \qquad \text{Equation 16}$$

$$Gz_A = \frac{\pi}{15} Rtg|\cos(Inc)| \qquad \text{Equation 17}$$

where $Vz_A$ represents the corrected axial vibration parameter, $Az_A$ represents the axial vibration parameter, $Gz_A$ represents the axial gravitational acceleration component, R represents the rotation rate of the sensor sub in units of RPM, t represents the predetermined measurement interval in units of seconds, g represents the gravitational acceleration of the earth, and Inc represents the borehole inclination. Note that axial gravitational acceleration component is maximum in a vertical well (zero degree inclination) and near zero in a horizontal well (90 degree inclination). The rotation rate of the sensor sub is preferably determined via simultaneous magnetometer measurements as described above.

The previously described magnetometer measurements may also be utilized to obtain a stick/slip parameter (a torsional vibration parameter), thereby enabling a full suite of dynamics measurements to be obtained using the navigational sensors (i.e., lateral vibration, axial vibration, and torsional vibration). Stick/slip is commonly quantified in the industry as a maximum drill string rotation rate minus a minimum drill string rotation rate within some predetermined time period. For the purposes of this disclosure, a stick/slip parameter may be quantified mathematically, for example, as follows:

$$SSN = \frac{\max\omega - \min\omega}{ave\omega} \qquad \text{Equation 18}$$

where SSN represents a normalized stick/slip parameter, $\max\omega$ and $\min\omega$ represent maximum and minimum instantaneous angular velocities during some predetermined time period, and $ave\omega$ represents the average angular velocity during the predetermine time period (e.g., 10 seconds). It will, of course, be appreciated that the stick/slip parameter SS need not be normalized as shown in Equation 16, but may instead be expressed simply as the difference between the maximum and minimum instantaneous rotation rates $\max\omega$ and $\min\omega$. In certain severe applications, stick/slip conditions can cause the drill string to temporarily stop rotating (i.e., such that: $\min\omega=0$). In such applications, the stick/slip parameter is essentially equal to or proportional to the maximum instantaneous rotation rate $\max\omega$. As such, it will be understood that $\max\omega$ may be a suitable alternative metric for quantifying stick/slip conditions. This alternative metric may be suitable for some drilling applications, especially since damage and wear to the drill bit and other BHA components is commonly understood to be related to the maximum instantaneous drill string rotation rate. The maximum instantaneous rotation rate may be computed downhole and transmitted to the surface where an operator may compare the value with the surface controlled (average) rotation rate.

The instantaneous rotation rate may be advantageously determined via magnetometer measurements, for example, as described above with respect to Equation 13. For example, the instantaneous rotation rate of the sensor sub may be computed via differentiating magnetic toolface measurements as follows:

$$\omega = \frac{\theta_m(n) - \theta_m(n-1)}{t} \qquad \text{Equation 19}$$

where $\omega$ represents the angular velocity of the sensor sub, $\theta_m$ represents the magnetic toolface, t represents the predetermined measurement interval, and n represents the array index in the set of magnetic toolface measurements such that $\theta_m(n-1)$ and $\theta_m(n)$ represent sequential magnetic toolface measurements. Therefore a stick slip parameter may be obtained, for example, via (i) rotating magnetic field sensors in the borehole, (ii) obtaining a plurality of magnetic field measurements at a predetermined measurement interval, (iii) processing the magnetic field measurements to obtain corresponding magnetic toolface measurements, (iv) differentiating the magnetic toolface measurements to obtain angular velocities, (v) alternatively integrate the differentiated toolface values to obtain sub-sampled angular velocities, and (vi) and processing the angular velocities to obtain the stick/slip parameter. The alternative integration step and sub-sampling step may enable a frequency dependence of the torsioanl vibration to be evaluated, e.g. a high-frequency torsional vibration severity (10~20 mS) and a low-frequency torsional vibration severity (100 mS~200 mS). In the embodiments described above, the original sampling rate is 100 samples per second. By integration, the differentiated data may be sub-sampled at substantially any other suitable frequency, for example, including 10 or 50 samples per second. The sub-sampled data may then be evaluated so as to monitor the vibration severities at predetermined frequencies.

Magnetic field measurements may be further utilized to correct accelerometer measurements for vibrational effects such that a corrected gravity toolface angle may be computed. For example, the corrected gravity toolface angle may be computed while drilling via: (i) rotating magnetic field sensors and accelerometers in a borehole, (ii) obtaining a plurality of magnetic field measurements and accelerometer measurements at a predetermined measurement interval while rotating (or drilling), (iii) processing the magnetic field measurements to obtain centripetal and/or tangential acceleration components (e.g., via Equations 10 and 13 as described above), (iv) subtracting at least one of the centripetal and tangential acceleration components from the corresponding accelerometer measurements to obtain corrected accelerometer measurements, and (v) utilizing the corrected accelerometer measurements to compute a corrected gravity toolface. Such corrected gravity toolface measurements may be utilized, for example, in LWD imaging tools.

It will be understood that the computed downhole dynamics parameters may be stored in downhole memory for subsequent surface analysis and/or transmitted to the surface during drilling to enable substantially real time mitigation as required. Those of ordinary skill will readily appreciate the potential benefits of transmitting the dynamics parameter(s) while drilling so that corrective measures (including changes to the drilling parameters) may be implemented if necessary. Due to the bandwidth constraints of conventional telemetry techniques (e.g., including mud pulse and mud siren telemetry techniques), each of the dynamics parameters may be advantageously reduced to a two-bit value (i.e., four levels; low, medium, high, and severe). Non-limiting encoding examples are shown in Table 1 for axial and lateral vibration parameters and Table 2 for a stick/slip parameter.

TABLE 1

Axial and Lateral Vibration Parameter

| Axial/Lateral Vibration | Level | Binary Representation |
|---|---|---|
| <1 G | Low | 00 |
| 1-2 G | Medium | 01 |
| 2-3 G | High | 10 |
| >3 G | Severe | 11 |

TABLE 2

Normalized Stick/slip Parameter

| Normalized Stick/slip | Level | Binary Representation |
|---|---|---|
| <50% | Low | 00 |
| 50-100% | Medium | 01 |
| 100-150% | High | 10 |
| >150% | Severe | 11 |

It will of course be understood that the raw magnetometer and accelerometer data may be transmitted to the surface (e.g., using a wired drillpipe) and that the raw data may be processed at the surface according to any one or more of the various methods disclosed herein.

Advantages of specific embodiments are now described in further detail by way of the following example, which is intended to be an example only and should not be construed as in any way limiting the scope of the claims. Dynamics data was obtained using the disclosed methods in a substantially horizontal section of a borehole that was being drilling in a shale formation. The navigational sensors were deployed in a PathFinder® iPZIG® sensor sub deployed immediately above the bit that included conventional tri-axial accelerometers and tri-axial flux-gate magnetometers. The accelerometer configuration was similar to that depicted on FIG. 3. A conventional mud motor (having a bent housing) was deployed above the iPZIG® sensor sub. A conventional EM (electromagnetic) short-hop enabled the two-way communication with other tools in a BHA (such as MWD and telemetry tools) across the motor. It will of course be understood that the disclosed embodiments are not limited to the use of a near-bit sensor sub, but are equally applicable to the MWD directional module deployed further away from the bit and/or other LWD imaging tools (gamma, density, neutron, caliper, resistivity imaging tools) including a directional sensor package.

Figure 6A:
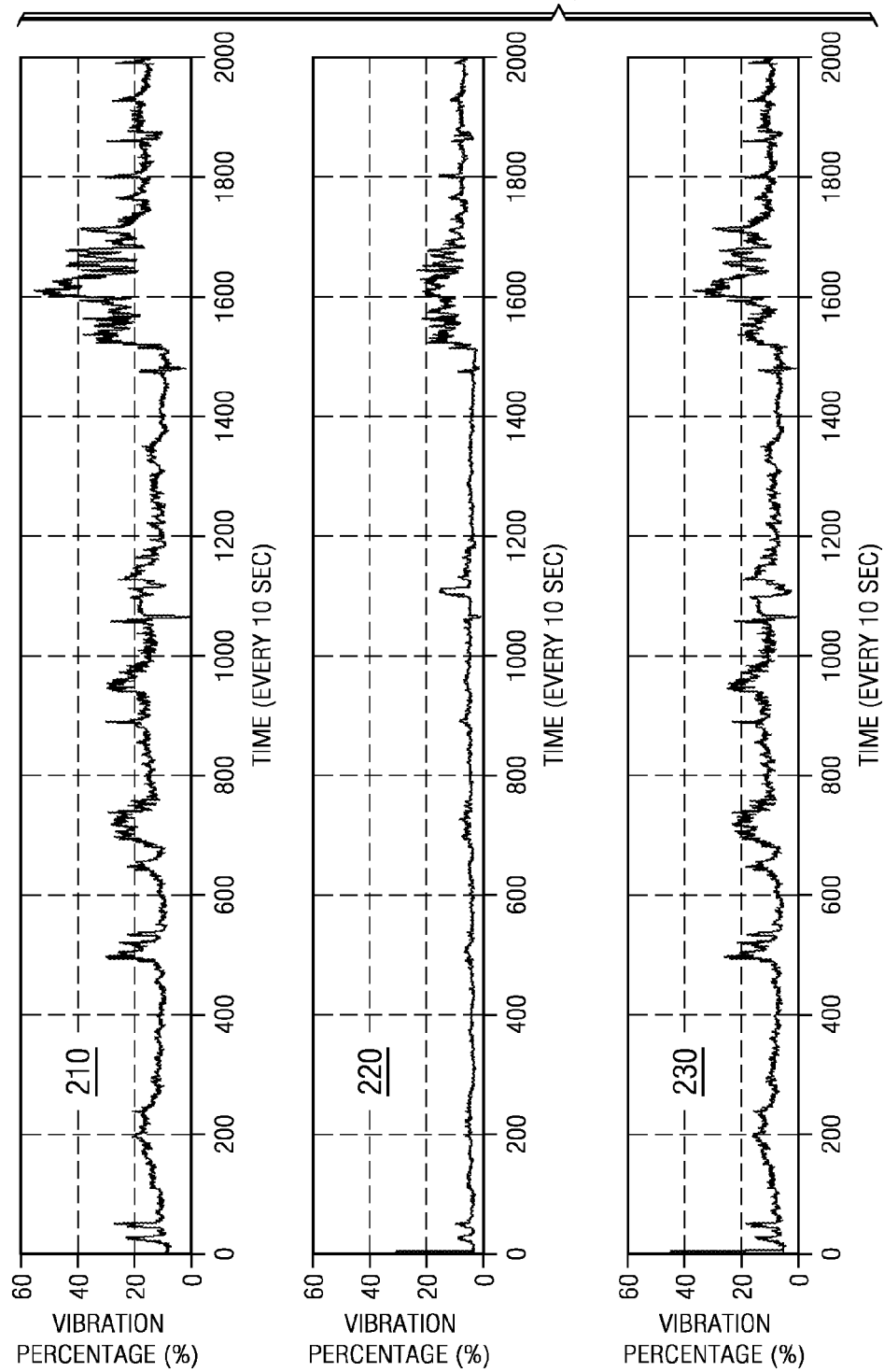
FIGS. 6A and 6B depict plots of various vibration parameters versus time during a drilling operation.
Figure 6B:
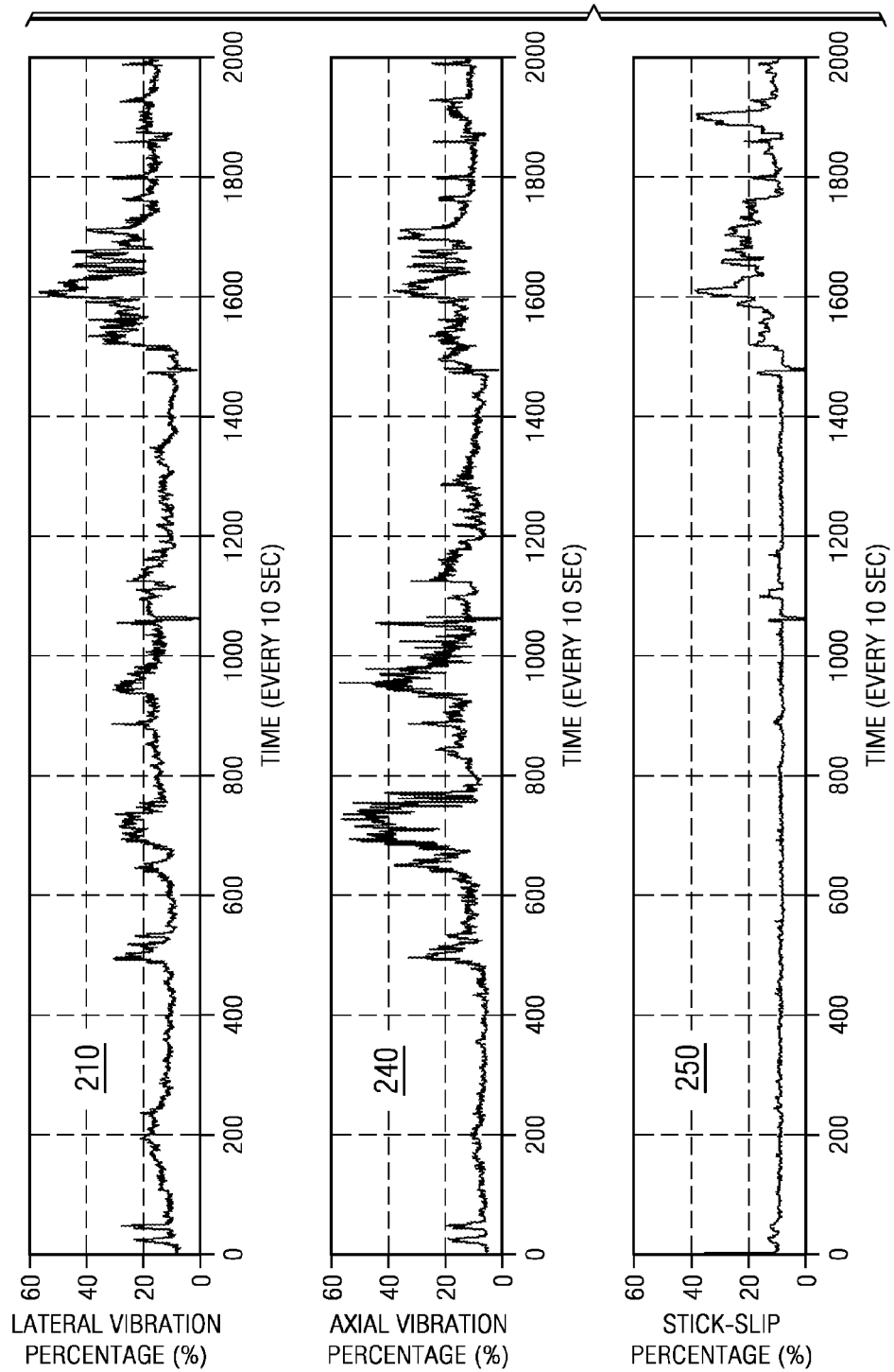

FIGS. 6A and 6B depict plots of various vibration parameters versus time during drilling. FIG. 6A depicts a lateral vibration parameter computed using Equations 1 and 2 at 210, a tangential acceleration component computed using Equations 10 and 11 and magnetometer based angular velocity measurements at 220 and a corrected lateral vibration parameter using Equation 9 at 230 (i.e., the lateral vibration parameter minus the tangential acceleration component). FIG. 6B depicts the lateral vibration parameter at 210, an axial vibration parameter computed using Equations 1 and 2 at 240, and a stick/slip parameter computed using Equations 18 and 19 at 250.

Removal of the tangential acceleration component reduces the noise floor by approximately half (from about 20% to about 10%) thereby improving a signal to noise ratio of the computed vibration parameter. Lateral and axial vibration events are clearly depicted, for example, at about 500, 700, and 950 seconds in the depicted examples. It should be noted that the rotation rate of the drill string was increased from about 140 to about 220 rpm at 1500 seconds. Increasing the rotation rate was observed to increase both the lateral and tangential vibration components. The stick/slip also increased from a noise floor of about 10 percent to about 30 percent with the increase in rotation rate.

It will be understood that while not shown in FIGS. 1, 2, and 3, bottom hole assemblies suitable for use the disclosed embodiments generally include at least one electronic controller. Such a controller typically includes signal processing circuitry including a digital processor (a microprocessor), an analog to digital converter, and processor readable memory. The controller typically also includes processor-readable or computer-readable program code embodying logic, including instructions for computing vibrational parameters as described above, for example, in Equations 1-19. One skilled in the art will also readily recognize that the above mentioned equations may also be solved using hardware mechanisms (e.g., including analog or digital circuits).

A suitable controller typically includes a timer including, for example, an incrementing counter, a decrementing time-out counter, or a real-time clock. The controller may further include multiple data storage devices, various sensors, other controllable components, a power supply, and the like. The controller may also optionally communicate with other instruments in the drill string, such as telemetry systems that communicate with the surface or an EM (electro-magnetic) shorthop that enables the two-way communication across a downhole motor. It will be appreciated that the controller is not necessarily located in the sensor sub (e.g., sub 60), but may be disposed elsewhere in the drill string in electronic communication therewith. Moreover, one skilled in the art will readily recognize that the multiple functions described above may be distributed among a number of electronic devices (controllers).

Although downhole dynamics measurements using navigational sensors and certain advantages thereof have been described in detail, it should be understood that various changes, substitutions and alternations can be made herein without departing from the spirit and scope of the disclosure as defined by the appended claims.

What is claimed is:

1. A method for making downhole dynamics measurements in a drill string, the method comprising:
    (a) rotating a downhole navigational sensor set in a borehole, the navigational sensor set deployed in the drill string and including at least first, second, and third tri-axial accelerometers;
    (b) causing the navigational sensor set to obtain a string of accelerometer measurements, the string of accelerometer measurements including a plurality of tri-axial accelerometer measurements made at a predetermined measurement interval;
    (c) differentiating the string of accelerometer measurements obtained in (b) to obtain a corresponding string of differentiated accelerometer measurements;
    (d) causing a downhole processor to process the differentiated accelerometer measurements obtained in (c) to obtain a drill string vibration parameter;
    (e) causing the downhole processor to further process the drill string vibration parameter obtained in (d) so as to remove at least one of a gravitational acceleration component, a tangential acceleration component, and a centripetal acceleration component to obtain a corrected drill string vibration parameter; and
    (f) implementing one or more corrective measures based on the corrected drill string vibration parameter, wherein the corrective measures comprise the step of adjusting a dynamic drilling condition, the dynamic drilling condition comprising axial vibration, lateral shock, lateral vibration, torsional vibration and/or stick/slip.

2. The method of claim 1, wherein the corrected drill string vibration parameter is obtained in (e) by subtracting a gravitational acceleration component from the drill string vibration parameter obtained in (d).

3. The method of claim 2, wherein the gravitational acceleration component is proportional to a borehole inclination and a rotation rate of the navigational sensor set in the borehole.

4. The method of claim 2, wherein the gravitational acceleration component is computed according to one of the following equations:

$$Gi_\Delta = \frac{\pi}{15} Rtg\sin(Inc)$$

$$Gz_\Delta = \frac{\pi}{15} Rtg\cos(Inc)$$

wherein $Gi_A$ represents a cross-axial component of the gravitational acceleration component, $Gz_A$ represents an axial component of the gravitational acceleration component, R represents a rotation rate of the sensor set, t represents the predetermined measurement interval, g represents a gravitational acceleration of the earth, and Inc represents a borehole inclination.

5. The method of claim 1, wherein the corrected drill string vibration parameter is obtained in (e) by subtracting a tangential acceleration component from the drill string vibration parameter obtained in (d).

6. The method of claim 5, wherein the tangential acceleration component is computed using magnetic field measurements made substantially simultaneously with the accelerometer measurements.

7. The method of claim 5, wherein the tangential acceleration component is computed according to one of the following equations:

$$Ti_A = \max Ti - \min Ti$$

$$Ti_A = 2\max Ti$$

wherein $Ti_A$ represents the tangential acceleration component, $Ti$ represents a substantially instantaneous tangential acceleration, $\max Ti$ and $\min Ti$ represent the maximum and minimum instantaneous tangential accelerations within a set of measurements, and i represents the x- or y-axis.

8. The method of claim 7, wherein the instantaneous tangential acceleration is computed according to the following equation:

$$Ti = r\alpha = r\left[\frac{\omega(n) - \omega(n-1)}{t}\right]$$

wherein $Ti$ represents the instantaneous tangential acceleration component, $r$ represents a radial distance between the corresponding accelerometer and an axis about which the accelerometer rotates, $\alpha$ represents an angular acceleration of the accelerometer, $\omega$ represents an angular velocity of the accelerometer, $t$ represents the predetermined measurement interval, and n represents an array index such that $\omega(n-1)$ and $\omega(n)$ represent sequential angular velocity measurements.

9. The method of claim 1, wherein the corrected drill string vibration parameter is obtained in (e) by subtracting a centripetal acceleration component from the drill string vibration parameter obtained in (d).

10. The method of claim 9, wherein the centripetal acceleration component is computed using magnetic field measurements made substantially simultaneously with the accelerometer measurements.

11. The method of claim 9, wherein the centripetal acceleration component is computed according to the following equation:

$$Ci_A = \max Ci - \min Ci$$

wherein $Ci_A$ represents the centripetal acceleration component, $Ci$ represents a substantially instantaneous centripetal acceleration, $\max Ci$ and $\min Ci$ represent the maximum and minimum tangential accelerations within a set of measurements, and i represents the x- or y-axis.

12. The method of claim 11, wherein the instantaneous centripetal acceleration is computed according to the following equation:

$$Ci = r\omega^2 = r\left[\frac{\theta_m(n) - \theta_m(n-1)}{t}\right]^2$$

wherein $Ci$ represents the instantaneous centripetal acceleration component, $r$ represents a radial distance between the corresponding accelerometer and an axis about which the accelerometer rotates, $\alpha$ represents an angular acceleration of the accelerometer, $\omega$ represents an angular velocity of the accelerometer, $t$ represents the predetermined measurement interval, and n represents the array index such that $\theta(n-1)$ and $\theta(n)$ represent sequential magnetic toolface measurements.

* * * * *